United States Patent Office 3,608,461
Patented Sept. 28, 1971

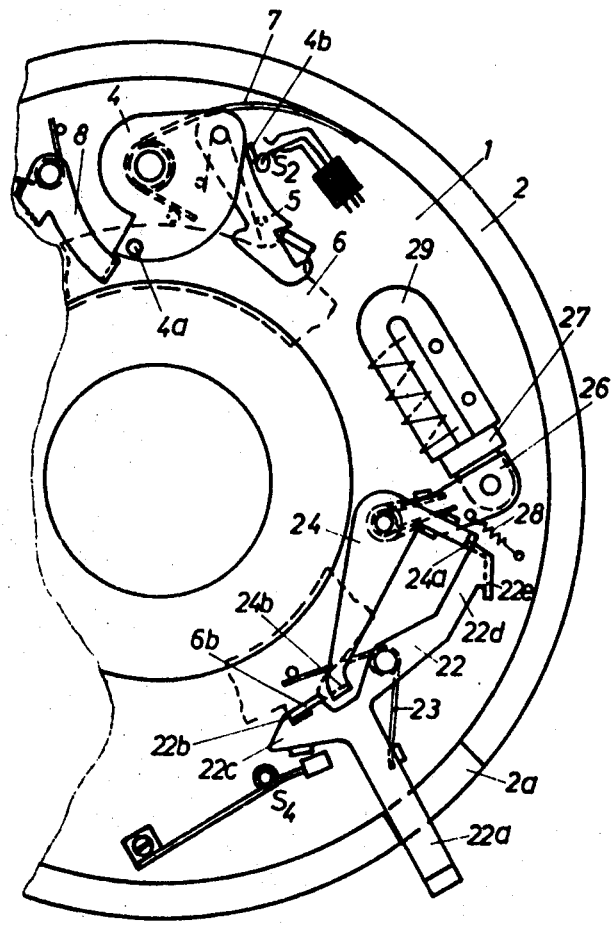
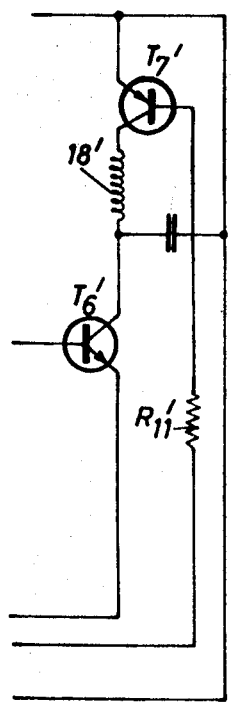

3,608,461
PHOTOGRAPHIC SHUTTER WITH ELECTRONIC TIMING DEVICE AND AN ELECTRONIC TIME CONTROL DEVICE FOR SELF-TIME PHOTOGRAPHS
Winfried Espig, Calmbach, Schwarzwald, Germany, assignor to Prontor-Werk Alfred Gauthier G.m.b.H., Calmbach, Schwarzwald, Germany
Filed July 22, 1968, Ser. No. 746,500
Claims priority, application Germany, July 26, 1967,
P 15 97 358.7
Int. Cl. G03b 9/64
U.S. Cl. 95—53.3
9 Claims

ABSTRACT OF THE DISCLOSURE

A photographic shutter having an electronic timing device including an exposure time control circuit with a battery and a branch with a shutter locking electromagnet. An electromagnetic open-time shutter lock for the shutter drive and an electronic delay device is connected to the shutter lock to temporarily lock the shutter action after release. The electronic delay device has a switching device operable at the end of the delay period to connect the electromagnet of the exposure time control circuit to the battery. The switching device is in the form of an electronic switch connected to the branch of the exposure time control circuit that includes the shutter locking electromagnet.

---

Figure 1:
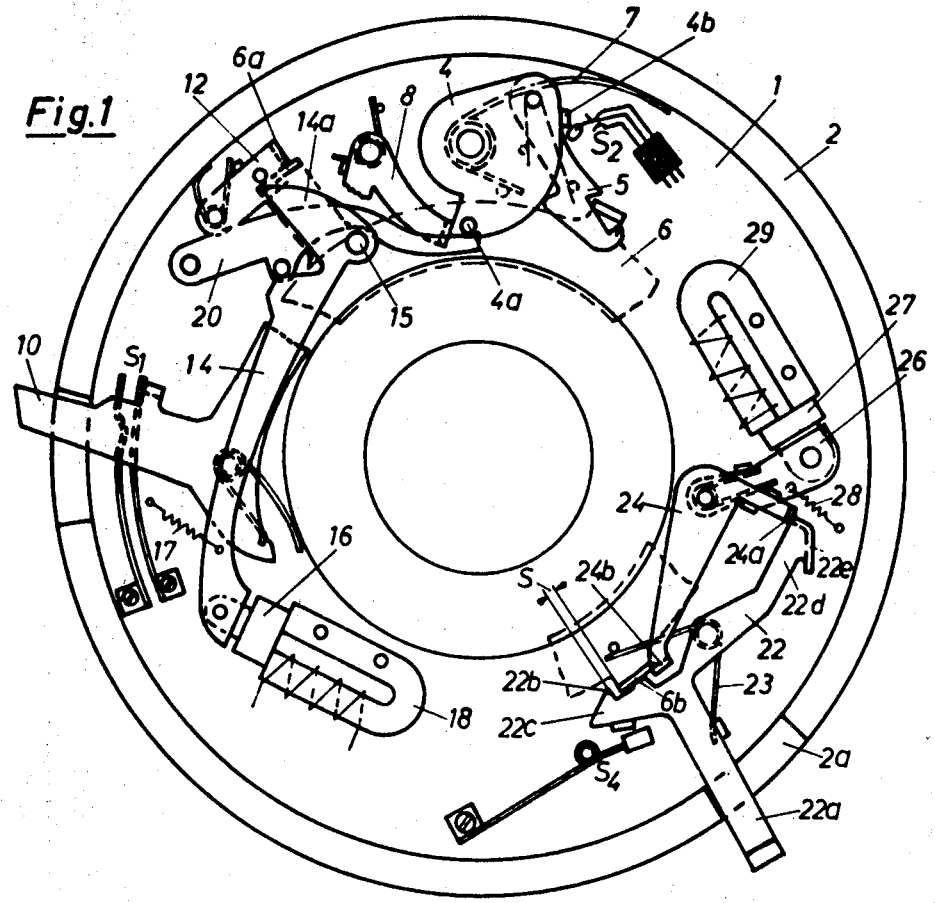

The invention concerns a photographic shutter with an electronic timing device including an electromagnetic open-time delay or lock for the shutter drive, with an optionally usable delayed action device operated electronically, temporarily locking the shutter action after release and before opening; there is a switching device provided which at the end of the delayed action period is actuated and connects the electromagnet of the exposure time control circuit to a current supply.

In order, in connection with shutters of the kind referred to above, to prevent the holding magnet of the exposure time control circuit from drawing current and hence subject the battery to unnecessary loading during the action of the delay circuit, a mechanical switch has already been proposed which, on cancellation of the magnetic field in the magnet providing the delay action and the release of the shutter drive system resulting therefrom, closes the contact and hence connects the holding magnet of the exposure time control circuit to the current supply.

Experience has shown that the use of a mechanical switch has inherent drawbacks inasmuch as difficulties are encountered in finding a suitable place therefor in the interior of the shutter. A mechanical switch also requires precise adjustment, in such a way that on completion of the delay period preceding the actual exposure time, the armature actuated by the delay circuit closes the mechanical switch as early as possible to ensure that the build-up of the magnetic field in the magnet of the shutter time control circuit has been concluded by the time the action of the shutter blade system begins. Since however the build-up of the magnetic field in the aforesaid magnet case requires a period of 4 to 5 ms., and the time from switching off the current in the magnet of the delay circuit to the starting movement of the segment ring also amounts to 4 to 5 ms., a satisfactory adjustment of the mechanical switch is not readily possible, since from even the earliest possible closing thereof to the starting of the movement of the segment ring, at the most only 2 to 3 ms. are available for the build-up of the magnetic field in the magnet of the exposure time control circuit. The remaining time of 1 to 2 ms. is required for closing the mechanical switch. Thus when the segment ring of a shutter starts to move, the magnet connected in the exposure time control circuit has not yet reached its full holding power, so that in certain circumstances the armature cooperating therewith can break away and cause the shutter blade system to change prematurely over to a closed position. A further requirement of a mechanical switch is that it operates free of contact bounce.

It is an object of the present invention to avoid the drawbacks resulting from the use of a mechanical switch in an electronic shutter of the kind referred to above. In this connection the invention proposes an arrangement of an electronic switch which is associated with a branch of the exposure time control circuit including the electromagnet actuating the shutter open-time lock. This enables the electromagnet of the open-time lock to be prematurely connected to a current supply such as a battery without necessitating a critical adjusting operation. The time between the end of the delayed action time and the starting of the shutter drive mechanism is now fully available for building up the magnetic field in the shutter timing electromagnet, this ensuring a satisfactory functioning of the said electromagnet. The electronic switch is readily mountable within the space available in the shutter casing. A further advantage is that the electronic switch has a reliability of action greatly in excess of the mechanical switches hitherto used in photographic shutters.

In order to limit the space for installing an electronic switch to a minimum, and to bring about in a simple manner a correctly time control of this switch, the electronic switch is formed as a transistor and the control circuit serving to delay the shutter action is a known transistor tripping circuit, the base of the switch transistor being connected to the emitter of the end transistor of this tripping circuit, with its emtiter-collector path associated with a transistor in the exposure time control circuit actuating the electromagnet effecting the shutter timing.

To reduce voltage drop losses the switch transistor is connected with its emitter-collector path parallel to the base-emitter path of a transistor operated by the exposure time control circuit. The same effect may also be attained when the switch transistor with its collector circuit is coupled to the base of the end transistor of the exposure time control circuit, with its emitter connected to the emitter of the transistor controllable by this circuit. A further alternative for the switch transistor consists in that this transistor with its emitter collector path is connected in series with the emitter-collector path of a transistor operated by the exposure time control circuit and the electromagnet controlling the shutter exposure time.

The drawings illustrate possibilities for the arrangement of the switch transistor in the circuit of the electronic timing device, and a shutter equipped for use of the invention.

Figure 2:
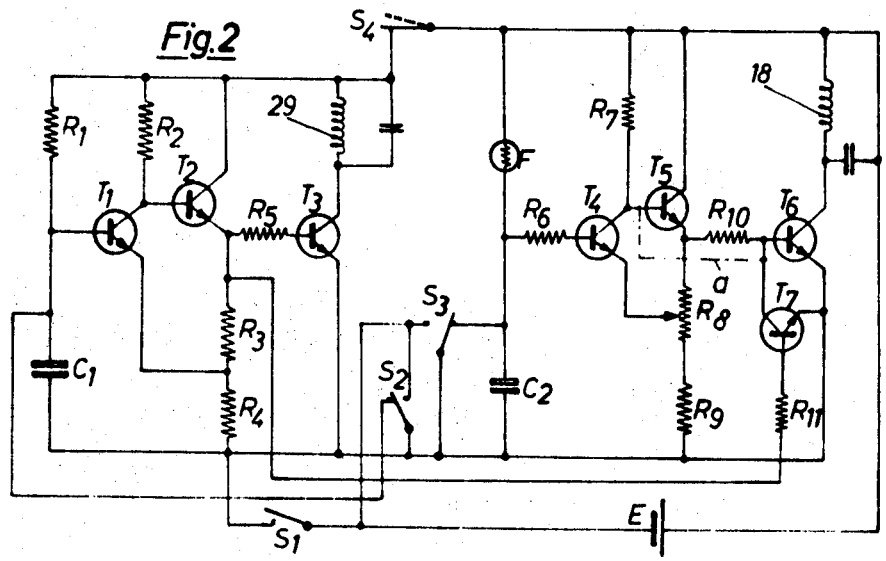

In the accompanying drawings,

FIG. 1 is a plan view of the shutter in the cocked position and prepared for delayed action exposures, FIG. 2 shows the two switching circuits for the electronic control of delay time and exposure time, chain-dotted lines showing an alternative for the circuit of the switch transistor, FIG. 3 shows the collaboration of the segment ring and delay time stop after the shutter is released, FIG. 4 a further alternative circuit for the switch transistor.

In the embodiment shown in FIG. 1 of a photographic shutter with electronic exposure time and delay time control, the numeral 1 denotes the shutter base plate and 2 the shutter housing. On the base plate 1 there is a shutter drive mechanism formed as a crank drive comprising a rotatably mounted driving disc 4, a thrust pawl 5 journalled thereto and a shutter segment ring 6 engaging therewith. A driving spring 7 rotates the driving disc 4 clockwise after its release, the segment ring 6 executing a reciprocating movement. In the cocked position as shown in FIG. 1, the driving disc 4 is located by a two-armed release lever 8 which is adapted to be moved out of the stop (shutter closed) position by means of an actuating lever 10.

The shutter driving mechanism has an electronically controlled timing device associated therewith, which includes an electromagnetic open-time stop. The latter includes a trapping lever 12 which at the end of the opening movement of the segment ring 6 slides under spring action off its arm 6a and assumes a position with the end face in front of the arm, whereby the shutter drive is locked. On completion of the exposure time the trapping lever 12 is moved by the cam 14a of an armature lever 14 out of the stop position; the lever 14 is mounted on a pin 15 and carries an armature 16. The latter, when the shutter is cocked, is pressed against an electromagnet 18 against the action of a return spring 17, for which purpose a pressure application lever 20 is provided which during the cocking operation is engaged by a pin 4a of the driving disc and swings the armature lever against the electromagnet 18.

The above-described shutter arrangement is further equipped for carrying out delayed-action exposures with an optionally switchable electronic device, which temporarily delays the action movement of the shutter after release. This device includes a three-armed delay lever 22 which is adapted to be transferred into the locking position as shown in FIG. 1 by means of its arm 22a against the action of a return spring 23. In this position one catch edge 22b of the arm 22c is located in front of a flap 6b of the segment ring 6. The third arm 22d which has a downwardly bent lug 22e, has a lever mechanism associated therewith comprising a two-armed supporting lever 24 and an armature lever 26 coaxially mounted therewith. The levers 24 and 26 are positively interconnected and act as a spring shunt. At one end the lever 24 is provided with a lug 24a against which the stop lever 22 is supported in the catch position. On the other (preferably resilient) arm of the supporting lever 24 a downwardly bent lug 24b is formed which, when the delay lever is transferred into the locking position as shown in FIG. 1, assumes a position in front of the lug 6b of the segment ring 6. In this position the armature lever 26 with its armature 27 is held against an electromagnet 29 against the action of a return spring 28.

As already indicated, the delayed action device operates electronically. For this purpose the electromagnet 29 of this device is included in an electric circuit which as shown schematically in FIG. 2 is a transistor tripping circuit. The latter includes the two emitter-couple transistors $T_1$ and $T_2$, the transistor $T_3$ and the RC circuit formed by the resistor $R_1$ and the capacitor $C_1$. Further components of this circuit are the resistors $R_2$ to $R_5$, the arrangement of which is shown in FIG. 2. The base of of the transistor $T_3$ is connected via the resistor $R_5$ to the emitter of the transistor $T_2$ acting as the end transistor of the tripping circuit, whilst the collector circuit of the first-mentioned transistor includes the coil of the electromagnet 29.

To control the exposure time there is also provided an electronic circuit the structure of which is shown in the righthand portion of the circuit of FIG. 2. The exposure time control circuit includes the transistors $T_4$, $T_5$ and $T_6$, an RC circuit formed by a photoelectric resistor F and a capacitor $C_2$, and several resistors $R_6$ to $R_{10}$. The coil of the electromagnet 18 co-operating with the open-time latch of the shutter is in series with the collector circuit of the transistor $T_6$.

A switch $S_1$ which is closed when actuating the lever 10 is provided to connect the two switch circuits described above to a source of current E. The change-over switch $S_2$ in the contact position shown in FIGS. 1 and 2 short-circuits the capacitor $C_1$. In the other contact position the switch $S_2$ acts in parallel with switch $S_1$ for actuating the control circuit for the duration of the delayed action time. For this purpose the switch $S_2$ is adapted to be actuated by means of a lug 4b of the driving disc 4. The arrangement is such that after the disc 4 has started up, but before the renewed locking of the shutter driving mechanism by the lever 22, the switch $S_2$ is changed over from the contact position shown, and is retained in this contact position for the duration of the delayed action time. The switch $S_3$ has the same function with regard to the exposure time control circuit, and is actuated by the segment ring 6. The changing over of the switch $S_3$ from the position shown, into the opposite position occurs directly after the disengagement of the segment ring 6 by the stop lever 22, and before the return of the switch $S_2$ into the short-circuit position. One lead of the delayed action time control circuit, when preparing the shutter for carrying out a delayed-action exposure, can be connected to the battery E by means of a further switch $S_4$. For this purpose the switch can be arranged in the region of arm 22c of the stop lever 22 which in its original position, not shown, provides for exposures without delayed action and retains this switch in the open position. When transferring the stop lever 22 into the locking position as shown in FIG. 1, the contact switch $S_4$ may be closed.

In order to ensure that when carrying out delayed action exposures the electromagnet 18 is energised directly the delay time has ended, and to ensure that the electromagnet shutter timing stop is able to carry out its locking function reliably with regard to the shutter driving mechanism, a further transistor $T_7$ is provided in the switching circuit of the exposure time control circuit which acts as a switch for the electromagnet 18. There are several possibilities for the circuit arrangement of the switching transistor $T_7$ in the circuit of the exposure time control circuit. In the schematic of FIG. 2 the switching transistor $T_7$ is formed as an n-p-n transistor which has its collector-emitter path connected in parallel with the base-emitter path of the transistor $T_6$ in the exposure time control circuit, with the base of $T_7$ connected via a resistor $R_{11}$ to the emitter of the end transistor $T_2$ of the delayed action time control circuit. With this connection of the transistor $T_7$ only the bottom bend of the characteristic of one transistor has to be considered as regards operation of the electromagnet 18.

The method of operation of the circuit in connection with the above-described shutter arrangement is as follows:

To carry out an exposure without delayed action the shutter drive is transferred into the cocked position shown in FIG. 1, whilst the lever 22 is left in the original position (not shown) in which the catch edge 22b is located outside the movement path of the lug 6b of the segment ring 6. In this case the switch $S_4$ is held open and the armature lever 26 disengaged from the electromagnet, whilst the supporting lever 24 with its lug 24a is supported against the lug 22e of the stop lever 22.

On moving the actuating lever 10 in an anti-clockwise direction the switch $S_1$ is first closed. The switching transistor $T_7$ receives a negative potential from the resistors $R_4$, $R_3$ and $R_{11}$, so that this transistor remains blocked and therefore is unable to exert any influence on the shutter time control or the current through the coil of the magnet 18. Closing the switch $S_1$ causes the two transistors $T_5$ and $T_6$ to become energised, whilst transistor $T_4$ remains blocked. Consequently a current flows in the electromagnet 18 which magentically holds the armature lever 14 in the position shown in FIG. 1. At the end of the pivotal movement of the lever 10 the driving disc 4 is released so that it can start in a clockwise direction and pull the segment ring 6 in the same direction of rotation. In the position of the ring 6 corresponding to the open position of the shutter the trapping lever 12 drops into position in front of the arm 6a and locks the retrograde movement of the segment ring for a certain period. In this stop position the trapping lever 12 is supported against the cam 14a of the armature lever 14. During the opening movement of the segment ring 6 the switch $S_3$ has been changed over so that the capacitor $C_2$ commences to charged. After a period corresponding to the resistance value of the photoelectric resistor F or corresponding to fixed resistor connected in place thereof in the switching circuit, the voltage on capacitor $C_2$ exceeds the base voltage of the transistor $T_4$ and the tripping circuit changes over. This causes the electromagnet 18 to be de-energised, so that the return spring 17 can rotate the armature lever 14 in a clockwise direction, the trapping lever 12 being moved out of the stop position by the cam 14a. This in turn allows the segment ring 6 to continue its anti-clockwise return movement and transfer the shutter blades into the closed position.

To carry out an exposure with delayed action the shutter drive mechanism is again brought into the cocked position shown in FIG. 1, the armature lever 14 being positively supported against the magnet 18. Then the lever 22 is transferred from the basic position described above into the locking position shown in FIG. 1. In this case the two levers 24 and 26 are rotated in an anti-clockwise direction, resulting in the abutment of the armature lever 26 against the electromagnet 29. The lug 24a of the supporting lever 24 assumes a position in front of the lug 22e of the lever 22, whilst the lug 24b springs into engagement in front of the bevelled lug 6b of the segment ring 6. This causes the levers 22, 24 and 26 to be automatically retained in the position shown in FIG. 1. Finally the switch $S_4$ is closed when the lever 22 is moved to the locking position.

When the lever 10 is actuated, the delayed action control circuit is connected to battery by closing the switch $S_1$. This causes the two transistors $T_2$ and $T_3$ to conduct, whilst $T_1$ for the time being remains de-energised. The electromagnet 29 therefore carries current so that the supporting lever 24 is now held by magnetic action in a position to lock the lever 22. The base of the switching transistor $T_7$ receives a positive potential via the operated collector-emitter path of the transistor $T_2$ and the resistor $R_{11}$ which turns on this transistor. Consequently at the base of the transistor $T_6$ a negative potential appears via the emitter and collector of the switching transistor whereby transistor $T_6$ is blocked and hence the current in the electromagnet 18 is interrupted.

At the end of the release movement of the actuating lever 10 the driving disc 4 is again released. After traversing the short distance s the shutter drive mechanism is locked anew by the stop lever 22 for the period of the delayed action required (FIG. 3). The shutter is still closed. Coincident with the start of the driving disc 4 the switch $S_2$ is changed over from the contact position shown by the lug 4b, so that after the release of the actuating lever 10 the delayed action timing control circuit remains connected to the battery E. The change-over of switch $S_2$ commences the charging of the capacitor $C_1$, which after a period dependent upon the resistor $R_1$ and capacitor value, say 8 to 10 seconds, reaches the base voltage of the transistor $T_1$. The latter then conducts, resulting in the blocking of transistor $T_2$. The base of transistor $T_3$ now receives a negative potential via $R_4$, $R_3$ and $R_5$ so that transistor $T_3$ is also blocked. Consequently the electromagnet 29 is de-energised, so that the spring 28 can rotate the two levers 26 and 24 clockwise and return them into their original positions. The stop lever 22 is no longer supported against the lever 24 and also returns into its original position, whereupon the shutter drive and timing action occurs in the manner described above.

Suppression of transistor $T_3$ also suppresses the switching transistor $T_7$, so that transistor $T_6$ and hence the electromagnet 18 carry current before the beginning of the return motion of the stop lever 22. During the return movement of the levers 26, 24 and 22 the electromagnet 18 has therefore built up its magnetic field. Consequently the armature lever 14 is magnetically held when the driving mechanism starts up from the position shown in FIG. 3. Premature release of the armature lever 14 and transfer of the trapping lever 12 into the ineffective position is thus effectively prevented. With the start of the shutter driving mechanism from the locked position as shown in FIG. 3 the switch $S_3$ is changed over and subsequently the switch $S_2$ returned into the original position as shown in FIG. 2. The electronic timing device therefore remains functionable via the switch $S_3$ acting in parallel. The further actions of the shutter driving mechanism and the electronic exposure time control circuit occur in the manner already described.

The switching effect of the switching transistor $T_7$ can also be obtained if the collector thereof, as indicated in chain-dotted lines a in the circuit of FIG. 2, is connected to the base of transistor $T_5$, since both transistors $T_5$ and $T_6$ act similarly. This means that blocking of the transistor $T_6$ by the switching transistor $T_7$ results in the blocking of transistor $T_6$ and de-energisation of the magnet 18; conduction of transistor $T_5$ also causes conduction of transistor $T_6$.

A further arrangement of the switching transistor in the circuit of the exposure time control circuit is shown in FIG. 4. This merely shows that part of the circuit which differs from the circuit shown in FIG. 2. In the circuit shown in FIG. 4 a p-n-p transistor $T_7'$ is used as the switching transistor which is connected with its collector-emitter path in series with the coil of the electromagnet 18' and to the collector-emitter path of transistor $T_6'$. The base of the switching transistor $T_7'$ is connected via the resistor $R_{11}'$ to the emitter of transistor $T_2$ of the delayed action control circuit.

When taking photographs without delayed action the switch $S_4$ remains open, so that with the closure of switch $S_1$ during the shutter release the base of the switching transistor $T_7'$ receives negative potential via the resistors $R_4$, $R_3$ and $R_{11}'$, which results in the operation of this transistor. The exposure time control circuit now carries out its described function i.e. with the closure of the switch $S_1$ the two transistor $T_5$ and $T_6'$ operate and the electromagnet 18' carries current. On expiration of the exposure time transistor $T_4$ conducts, whilst the two transistors $T_5$ and $T_6'$ are blocked, so that the electromagnet 18' actuating the open-time stop is de-energised.

To take photograph with delayed action the stop lever 22 is moved into the locking position shown in FIG. 1, the switch $S_4$ being closed. Closing of switch $S_1$ causes the electromagnet 29 to carry current, since transistor $T_1$ is suppressed, the two transistors $T_2$ and $T_3$ being conductive. The base of the switching transistor $T_7'$ connected via the resistor $R_{11}'$ to the emitter of transistor $T_2$, receives a positive potential, causing it to be blocked. The electromagnet 18' is therefore initially de-energised. With the change-over of the delayed action control circuit the base of the switching transistor $T_7'$ receives a negative potential resulting in its conduction. The electromagnet 18' is immediately connected to battery at the end of the delay period, so that the open-time stop is fully functional at the beginning of the shutter drive mechanism movement.

The invention is not restricted to the arrangements shown and described but also includes further embodiments. Thus, the n-p-n transistors may be replaced by p-n-p transistors. Furthermore a simple make switch may replace the switch $S_2$, by means of which only a parallel connection with the switch $S_1$ is established.

What is claimed is:

1. A photographic shutter including an electronic timing device, and a shutter drive, an exposure time control circuit having a battery and a branch associated therewith and a shutter locking electromagnet included in the branch circuit; an open-time shutter lock for the shutter drive; an electronic delay device connected to said shutter to temporarily lock the shutter action after release, said electronic delay device having associated therewith a switching device operable at the end of the delay period to connect said electromagnet of said exposure time control circuit to said battery, said switching device being an electronic switch connected to said branch of said exposure time control circuit including said electromagnet.

2. The photographic shutter of claim 1 wherein said electronic switch is a switching transistor and said control circuit providing the delay action is formed as a transistorized tripping circuit, said switching transistor having its base connected to the emitter of the end transistor of said tripping circuit, and said switching transistor having its emitter-collector path associated with a transistor of said exposure time control circuit in the collector circuit of the last named transistor in which said shutter timing electromagnet is located.

3. The photographic shutter of claim 2 wherein said switching transistor has its collector-emitter path connected in parallel with the base-emitter path of a transistor operated by said exposure time control circuit.

4. The photographic shutter of claim 2 wherein said switching transistor has its collector connected to the base of said end transistor of said exposure time control circuit and its emitter connected to the emitter of a transistor operated by said timing control circuit.

5. The photographic shutter of claim 2 wherein said switching transistor has its emitter-collector path connected in series with the emitter-collector path of a transistor operated by said exposure time control circuit and said shutter timing electromagnet.

6. A photographic shutter including an electronic timing device and a shutter drive, exposure time control circuit means having a power source and a shutter locking electromagnet, open-time shutter locking means for locking said shutter drive; electronic delay means connected to said shutter drive to temporarily lock the shutter action after release, said electronic delay means having associated therewith switching means operable at the end of the delay period to connect said electromagnet of said exposure time control circuit means to said battery, said switching means having a switching transistor, said control circuit means providing the delay action being formed as a transistorized tripping circuit, said switching transistor having its base connected to the emitter of the end transistor of said tripping circuit, and said switching transistor having its emitter-collector path cooperating with a transistor of said exposure time control circuit means, in the collector circuit of said last named transistor in which said shutter timing electromagnet is located.

7. The photographic shutter of claim 6 wherein said switching transistor has its collector-emitter path connected in parallel with the base-emitter path of a transistor operated by said exposure time control circuit means.

8. The photographic shutter of claim 6 wherein said switching transistor has its collector connected to the base of said end transistor of said exposure time control circuit means and its emitter connected to the emitter of a transistor operated by said timing control circuit means.

9. The photographic shutter of claim 6 wherein said switching transistor has its emitter-collector path connected in series with the emitter-collector path of a transistor operated by said exposure time control circuit and said shutter timing electromagnet.

References Cited

UNITED STATES PATENTS 3,450,015   6/1969   Reimann et al. _____ 95—53.3 X

FOREIGN PATENTS 1,258,726   1/1968   Germany _____ 95—53
995,790   6/1965   Great Britain _____ 95—53

SAMUEL S. MATTHEWS, Primary Examiner

R. L. MOSES, Assistant Examiner

U.S. Cl. X.R.

95—53E